(No Model.)
T. H. WILLIAMS & N. R. MARVIN.
VALVE.
No. 523,718. Patented July 31, 1894.
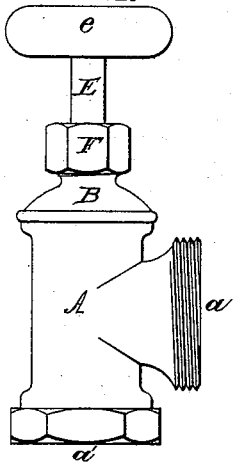
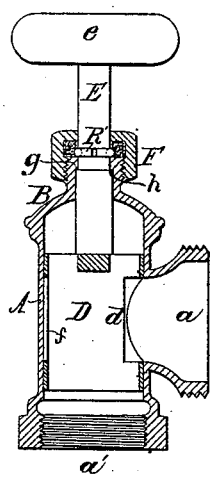 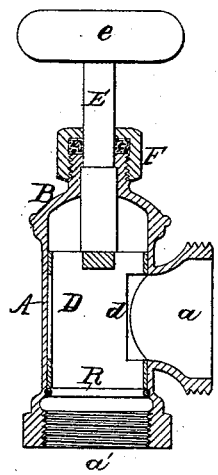
WITNESSES:
George Baumann
INVENTORS
Thomas H. Williams
Newton R. Marvin
BY Howson and Howson
their ATTORNEYS

UNITED STATES PATENT OFFICE.

THOMAS H. WILLIAMS AND NEWTON R. MARVIN, OF JERSEY CITY, NEW JERSEY, ASSIGNORS TO THE A. A. GRIFFING IRON COMPANY, OF SAME PLACE.

VALVE.

SPECIFICATION forming part of Letters Patent No. 523,718, dated July 31, 1894.

Application filed July 20, 1893. Serial No. 481,023. (No model.)

*To all whom it may concern:*

Be it known that we, THOMAS HILTON WILLIAMS and NEWTON ROYCE MARVIN, citizens of the United States, and residents of Jersey City, Hudson county, New Jersey, have invented Improved Valves, of which the following is a specification.

The object of our invention is to simplify the construction and economize the manufacture of valves, more particularly valves adapted for use in connection with hot water radiators, where the valve casing has its inlet and outlet openings at the side and bottom, as well as to render said valves more easy of operation than they have been heretofore.

In the accompanying drawings Figure 1 is a side view of our improved valve. Fig. 2 is a vertical section of the same; and Fig. 3 is a vertical section of a modification.

The casing A is preferably of the cylindrical form shown and if the lateral passage $a$ be taken as the outlet opening, the passage $a'$ at the bottom will be the inlet. The communication between the inlet and outlet is controlled by the hollow cylindrical valve D, which fits snugly and can turn within the body of the valve casing. This valve has a suitable opening $d$ in the side which when brought opposite the passage $a$, upon turning the valve, opens communication between inlet and outlet. Upon turning the valve from this open position shown, the solid portion of the hollow cylindrical valve will close the passage more or less or entirely, as may be desired. It is also provided with an opening $f$ in the wall which, not only lightens the valve and economizes metal, but acts to relieve the valve of the internal pressure to which it is subjected when used in high buildings when there is of necessity a strong head of water in the pipes of the system, this pressure having a tendency to expand the valve, which is very light and thin, and thus increase the friction between it and the valve casing. The valve is also open at the top, as shown, and the pressure of the water does not, therefore, act to force it upward against its bearings and create friction thereat. It will be observed that a valve thus constructed is subjected to equal pressure all around it, and that it can be as easily moved, except when closed or nearly closed, as though it were simply submerged in a body of water; also that, being of true cylindrical form, and not in the form of a truncated cone like other valves that are known in the art, it will not wedge in the casing when the operator grasps the hand wheel and inadvertently pulls upon the valve in the direction of its axis, or bind as do valves of truncated conical form which are held in a proper relation to their casings by screw caps that exert a pressure against the larger ends thereof, and crowd them to their normal and operative positions. It is to be noted, furthermore, that a cylindrical valve will perform its functions even though it be a little out of its true vertical position, for whatever its position it fits the casing with accuracy; while a valve of conical form, if moved in one directly too tightly, and if moved in the reverse direction too loosely, fits the casing.

It matters little if the cylindrical valve which we have shown is a little smaller than the casing, for the pressure of the water will crowd it against the outlet side of the casing when it is turned so as to close the outlet, and thus make a practically perfect closure. It is only at this time that the valve is subjected to any pressure that increases the friction between it and the casing.

It is our purpose to simplify such construction and economize in the cost of manufacture, and this we do by making the bonnet in one piece with the body of the casing and making the stem in one piece with the valve and inserting the latter with the stem from the under side up through the opening in the bottom of the casing and holding the valve in place by inserting a retaining ring, as we will now describe.

As will be seen on reference to Figs. 2 and 3, the bonnet B is cast in one piece with the body of the casing and is provided with a suitable opening for the passage of the stem E, which is formed in one piece with the hollow cylindrical valve D, the said opening having therein a shoulder $g$, against which a shoulder $h$ upon the valve stem bears. A bearing can be more readily made in the small part than in some part of the casing, which is of larger dimensions, because a small drill can be used to do the boring that produces the shoulder. A screw cap F is provided to screw onto the top of the bonnet to contain the packing and form the stuffing box for the stem of the valve.

As will be readily understood from the foregoing description, the valve with its stem is inserted from the under side through the passage $a'$, and any usual form of handle or hand wheel $e$ is then secured to the top of this stem, which passes through the stuffing box of the bonnet.

To hold the valve with its stem in place a suitable retaining ring of soft metal is provided. This retaining ring may be inserted in an annular groove in the casing at the bottom of the cylindrical valve, as shown at R in Fig. 3, supporting the valve at the under side; or the ring may be fitted into an annular groove in the stem of the valve and rest on the top of the bonnet, as at R' in the construction shown in Fig. 2, the latter construction being the preferred form. A ring so placed upon the stem acts not only as a retaining ring but as a washer so that, when the valve is rotated, in being opened or closed, it prevents, in a measure, the rotation of the stuffing box and consequent leakage.

We claim as our invention—

1. The herein described valve having the inlet and outlet passages of the casing at the bottom and side, and having the bonnet cast in one piece with the said casing, the said bonnet having a central opening provided with a shoulder in combination with a hollow cylindrical valve open at the bottom, side and top, and adapted to be inserted into the casing from the under side and provided with a stem extending through the opening in the bonnet, the said stem being provided with a shoulder for engaging the shoulder in the opening of the bonnet, means for preventing the valve from moving downward within the casing, and a stuffing box for the valve stem substantially as described.

2. The herein described valve having the inlet and outlet passages of the casing at the bottom and side, and having the bonnet cast in one piece with the said casing, the said bonnet having a central opening provided with a shoulder in combination with a hollow cylindrical valve open at the bottom, side and top, and adapted to be inserted into the casing from the under side and provided with a stem extending through the opening in the bonnet, the said stem being provided with a groove just above the top of the bonnet and with a shoulder for engaging the shoulder in the opening of the bonnet, a retaining ring for the valve compressed into the groove of the valve stem, and a stuffing box for the valve stem substantially as described.

3. A cylindrical valve casing having inlet and outlet ports and provided with an integral bonnet having a central orifice that is shaped to form a shoulder in combination with a valve of cylindrical form situated within the casing, open at both ends, and provided with a port and an opening in its circular wall, and having a stem that is provided with a shoulder extending through the central orifice and means for retaining the valve in position substantially as described.

In testimony whereof we have signed our names to this specification in the presence of two subscribing witnesses.

THOS. H. WILLIAMS.
NEWTON R. MARVIN.

Witnesses:
CHAS. V. TUTHILL.
JNO. M. C. THOMAS.

Correction in Letters Patent No. 523,718.

It is hereby certified that in Letters Patent No. 523,718, granted July 31, 1894, upon the application of Thomas H. Williams and Newton R. Marvin, of Jersey City, New Jersey, for an improvement in "Valves," an error appears in the printed specification requiring the following correction, viz: In line 70, page 1, the word "directly" should read *direction;* and that the said Letters Patent should be read with this correction therein that the same may conform to the record of the case in the Patent Office.

Signed, countersigned, and sealed this 14th day of August, A. D. 1894.

[SEAL.]
JNO. M. REYNOLDS,
*Assistant Secretary of the Interior.*

Countersigned:
JOHN S. SEYMOUR,
*Commissioner of Patents.*